United States Patent
Yeary et al.

(10) Patent No.: US 7,264,221 B2
(45) Date of Patent: Sep. 4, 2007

(54) BUTTERFLY VALVE ASSEMBLY WITH IMPROVED FLOW CHARACTERISTICS

(75) Inventors: Arthur R. Yeary, Chicago, IL (US); Aaron Kielar, Clinton, IL (US); Adam Zmick, Northbrook, IL (US); Matt Bardelli, Villa Park, IL (US)

(73) Assignee: Yeary & Associates, Inc., Villa Park, IL (US)

( * ) Notice: Subject to any disclaimer, the term of this patent is extended or adjusted under 35 U.S.C. 154(b) by 24 days.

(21) Appl. No.: 11/230,245

(22) Filed: Sep. 19, 2005

(65) Prior Publication Data

US 2007/0063163 A1 Mar. 22, 2007

(51) Int. Cl.
*F16K 47/00* (2006.01)
*F16L 55/02* (2006.01)

(52) U.S. Cl. ............... 251/127; 251/305; 251/308; 123/337

(58) Field of Classification Search ............ 251/118, 251/127, 305, 306, 307, 308; 123/337
See application file for complete search history.

(56) References Cited

U.S. PATENT DOCUMENTS

| | | | |
|---|---|---|---|
| 2,817,489 A | 12/1957 | Hesmer | |
| 3,931,955 A | 1/1976 | Jacobs | |
| 3,960,177 A | 6/1976 | Baumann | |
| 4,265,426 A * | 5/1981 | Thurston et al. | ............ 251/306 |
| 4,295,632 A | 10/1981 | Engelke | |
| 4,527,771 A | 7/1985 | Yeary | |
| 4,691,894 A | 9/1987 | Pyotsia et al. | |
| 5,102,097 A | 4/1992 | Davis et al. | |
| 5,180,139 A | 1/1993 | Gethmann et al. | |
| 5,333,838 A | 8/1994 | Garcia-Mallol | |
| 5,374,031 A | 12/1994 | Semence et al. | |
| 5,465,756 A | 11/1995 | Royalty et al. | |
| 5,480,123 A | 1/1996 | Bey | |
| 5,482,249 A | 1/1996 | Schafbuch et al. | |
| 5,588,635 A | 12/1996 | Hartman | |
| 5,741,006 A | 4/1998 | Murai et al. | |
| 6,024,125 A * | 2/2000 | Baumann | ............... 137/625.32 |
| 6,138,988 A * | 10/2000 | Bouvet et al. | ............... 251/306 |
| 6,446,934 B2 * | 9/2002 | Bonomi | ...................... 251/306 |
| 6,793,197 B2 | 9/2004 | DePenning et al. | |

* cited by examiner

*Primary Examiner*—Eric Keasel
*Assistant Examiner*—John K. Fristoe, Jr.
(74) *Attorney, Agent, or Firm*—Andrus, Sceales, Starke & Sawall, LLP (57) ABSTRACT

A control valve assembly that utilizes a butterfly valve having a valve body and a valve disc movable between a seated position and an open position. The control valve assembly includes a flow insert positioned along the interior of the valve body and generally aligned with a first outer sealing edge of the rotatable valve disc. The flow insert maintains close spacing to the first outer sealing edge of the valve disc as the valve disc initially moves away from the valve seat. The control valve assembly can also include a first, upstream butterfly cage and a second, downstream butterfly cage positioned on opposite sides of the valve body. The first and second butterfly cages aid in controlling the flow of fluid past the valve disc as the valve disc moves from its seated position to its open position.

13 Claims, 7 Drawing Sheets

- VALVE ALONE
- VALVE WITH INSERT
- EQUAL PERCENTAGE GLOBE VALVE

FIG. 12

- TRIAL
- GLOBE VALVE (EQUAL%)

BUTTERFLY VALVE ASSEMBLY WITH IMPROVED FLOW CHARACTERISTICS

BACKGROUND OF THE INVENTION

Butterfly valves are in common usage for controlling the flow of various fluids, i.e., liquid or gas, streams. Butterfly valves are used to throttle fluid flow and for on/off applications. A typical valve assembly of this type includes a body having a passage extending through it and a butterfly valve vane pivotally mounted within the body. The butterfly vane is characteristically in the form of a disc.

When fluid passes through a partially open butterfly valve, the fluid undergoes a significant pressure drop. One of the basic problems for butterfly valves is that this pressure drop tends to cause cavitation and consequent cavitation-induced damage in liquid service and noise in gas service.

In an attempt to solve these problems, it has been proposed to utilize a diffuser. A diffuser is a perforated member that increases the restriction near the valve opening and breaks the fluid stream into multiple jets. This has a positive effect on the cavitation and noise problems.

Generally, however, diffusers are either built into a particular valve or constructed to be applicable to only a single manufacturer's valve. For example, one such diffuser is integrally incorporated into the valve element such that it is not possible to utilize this diffuser in other valves. In addition, this diffuser has little or no affect on the ability of the valve element to provide improved flow control near the fully open position.

In addition, butterfly valves are generally not good control valves near the closed or fully opened positions of the valve. Specifically, near the closed position, small changes in the angle of the valve disc results in a relatively large change in flow, and in the nearly fully opened position, a relatively large change in the angle of the valve disc is required to produce even a relatively small change in flow.

For this reason, butterfly valves are currently used mainly for on/off purposes or for light controlling purposes. Since butterfly valves are notoriously uncontrollable at the ends of their actuation ranges, butterfly valves are not used in situations where accurate control is necessary. In situations that require accurate control, globe or segmented ball control valves are typically used. However, globe and segmented ball control valves are typically much larger and more expensive than butterfly valves. Thus, the ability to use a butterfly valve instead of either a globe or segmented ball control valve would be particularly desirable.

Although butterfly valves that include some type of an integral diffuser, or a separate diffuser element positioned at either the inlet or outlet, or both, resulting in the butterfly valve having better flow control characteristics than a butterfly valve without any type of integral diffuser, or separate diffuser element(s), it is desirable to provide a system for providing additional control capabilities of butterfly valves.

SUMMARY OF THE INVENTION

The present invention is related to a control valve assembly that provides enhanced flow characteristics for a butterfly valve during the initial opening of the valve disc. The increased controllability of the flow characteristics for the butterfly valve allows the butterfly valve to function as a more accurate and controllable control valve, similar to the operation of a globe valve.

The control valve assembly includes a valve body having an open passage extending between an upstream face surface and a downstream face surface. The flow passage is generally defined by a cylindrical outer wall.

The valve body includes a valve seat that is formed in the open passageway and protrudes slightly from the cylindrical outer wall that defines the opening through the valve body. A valve disc is rotatably supported across the open passage and can be rotated between a seated position and an open position. When the valve disc is in the seated position, both a first outer sealing edge and a second outer sealing edge of the valve disc engage the valve seat to prevent the flow of fluid past the valve disc. The valve disc is selectively rotatable from the seated position to an open position. As the valve disc rotates from the seated position to the open position, fluid flows past both the first outer sealing edge and the second outer sealing edge.

The control valve assembly includes a flow insert that is positioned along a portion of the generally cylindrical outer wall that defines the open passageway through the valve body. Preferably, the flow insert is positioned on one side of the pivot shaft axis and in general alignment with the first outer sealing edge of the valve disc such that when the valve disc moves away from the seated position, the first outer sealing edge remains in close proximity to the flow insert as the valve disc rotates. The flow insert restricts the flow of fluid past the first outer sealing edge during the initial movement of the valve disc from the seated position. At the same time, fluid flows past the second outer sealing edge, which allows for better control of the flow through the butterfly valve.

The flow insert extends from a first edge to a second edge, where the first edge is positioned generally adjacent to the valve seat. The second edge of the flow insert is positioned adjacent to the upstream face surface of the valve body. The flow insert includes a contact surface that extends between the first edge and the second edge, where the contact surface generally corresponds to the path of movement of the first outer sealing edge of the valve disc.

Although not required, the control valve assembly can include an upstream butterfly cage and a downstream butterfly cage to enhance the controllability of the butterfly valve. The upstream butterfly cage includes at least a pair of openings that allow fluid to flow through the butterfly cage and into contact with the moving valve disc. Likewise, the downstream butterfly cage includes an opening that allows fluid to flow through the downstream butterfly cage as the valve disc moves away from the seated position. Preferably, each of the upstream and downstream butterfly cages includes a center crossbar that enhances the full flow fluid characteristics of the valve assembly.

BRIEF DESCRIPTION OF THE DRAWINGS

The drawings illustrate the best mode presently contemplated of carrying out the invention. In the drawings.

DETAILED DESCRIPTION OF THE PREFERRED EMBODIMENT

Figure 1:
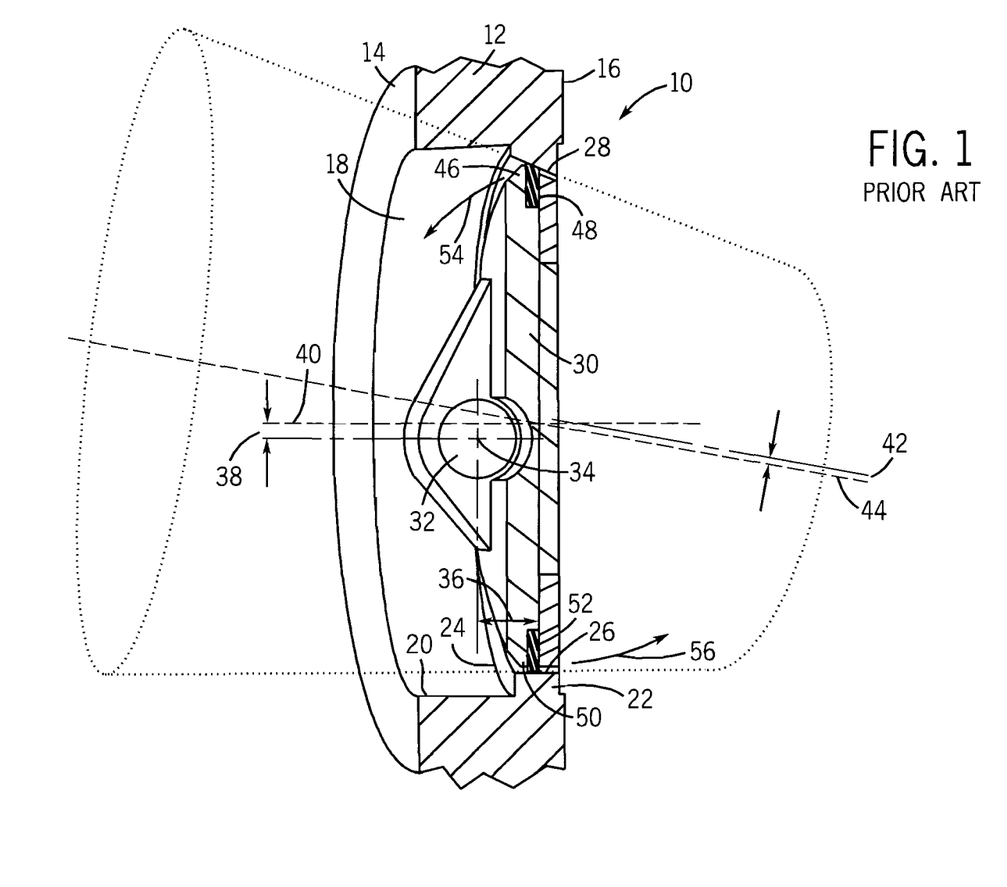
FIG. 1 is a section view illustrating the configuration of a triple offset butterfly valve.

FIG. 1 illustrates a conventional, triple offset butterfly valve 10. The butterfly valve 10 includes a valve body 12 that extends from an upstream face surface 14 to a downstream face surface 16 and is preferably formed from a metallic material, such as stainless steel. The valve body 12 defines an open passage 18 that allows fluid to flow through the valve body 12 from the upstream face surface 14 to the downstream face surface 16. The open passage 18 is defined by a generally cylindrical outer wall 20. The valve body 12 defines a valve seat 22 that extends radially inward from the outer wall 20 and is defined by an inner shoulder 24. As illustrated in FIG. 1, the valve seat 22 includes both a flat sealing surface 26 and an angled sealing surface 28. In general, the flat sealing surface 26 and the angled sealing surface 28 transition into each other along the circumference of the valve seat. Specifically, as the angled sealing surface 28 extends around the circumference of the valve seat, the angle of the sealing surface decreases until the sealing surface becomes flat, as shown by the flat sealing surface 26. Likewise, the flat sealing surface begins to extend at an angle from the lower portion of the valve seat 22 toward the midline of the valve seat and eventually transitions into the angled sealing surface 28. The transition from the flat sealing surface 26 to the angled sealing surface 28 provides the sealing surface for the valve disc 30.

Figure 7:
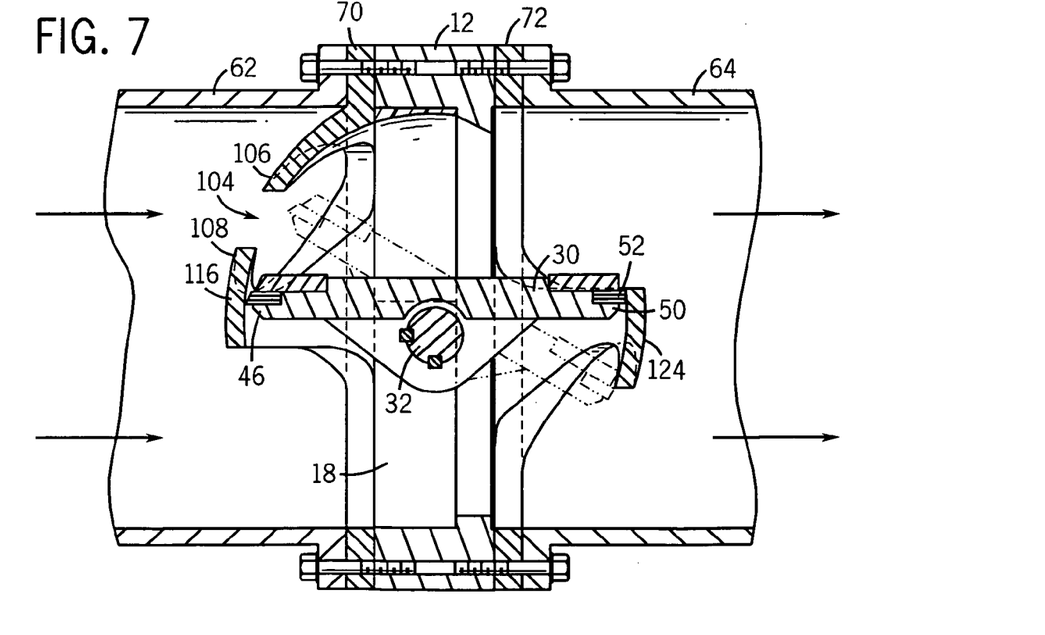
FIG. 7 is a partial section view similar to FIG. 6 illustrating further rotation of the valve disc.

The butterfly valve 10 includes a valve disc 30 that is rotatably positioned within the open passage 18 by a pivot shaft 32. The pivot shaft 32 includes a shaft axis 34 about which the valve disc 30 is rotatable between the sealing position shown in FIG. 1 and an open position (FIG. 7). The butterfly valve 10 illustrated in FIG. 1 is referred to as a triple offset butterfly valve. The first offset is shown by arrow 36 and is the offset distance from the shaft axis 34 to the center of the valve seat 22. The second offset 38 is the offset between the shaft axis 34 and the center line 40 of the open passage 18. The third offset is the amount the cone access 44 is offset from the center line of the valve seat 22 to provide a conical sealing surface.

The valve disc 30 includes a first outer sealing edge 46 that contacts the angled sealing surface 28 generally above the shaft axis 34 when the valve is positioned as shown in FIG. 1. The first outer sealing edge 46 includes a seal 48 that engages the angled sealing surface 28 as illustrated. As illustrated in FIG. 1, the first outer sealing edge 46 is positioned on a first side of the shaft axis 34 and moves upstream as the valve disc rotates away from the valve seat.

The valve disc 30 also includes a second outer sealing edge 50 having a seal 52 that engages the flat sealing surface 26. The second outer sealing edge 50 is positioned on the opposite side of the shaft axis 34 from the first outer sealing edge 46. The second sealing edge 46 moves downstream as the valve disc rotates away from the valve seat.

As discussed previously, the butterfly valve 10 shown in FIG. 1 is in the fully seated, closed position. When the butterfly valve 10 is initially opened, the valve disc 30 rotates such that the first outer sealing edge 46 moves in the direction shown by arrow 54 and the second outer sealing edge 50 moves in the direction shown by arrow 56. As the valve disc 30 rotates away from the sealing position, liquid begins to flow around the outer circumference of the valve disc 30 between the valve disc 30 and both the angled sealing surface 28 and the flat sealing surface 26.

Figure 11:
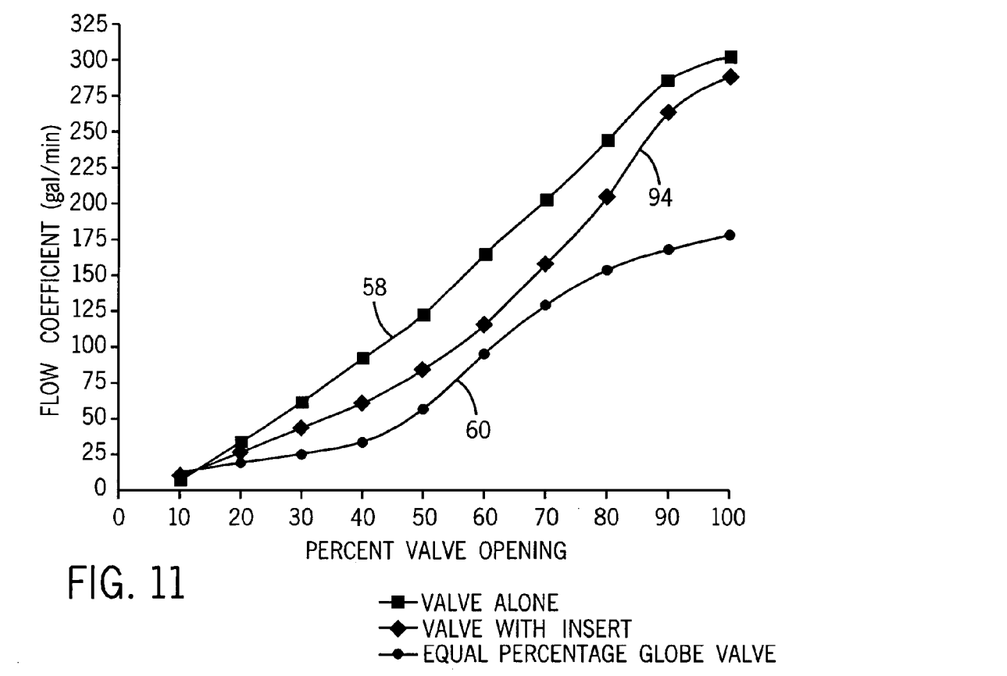
FIG. 11 is a graphical representation of the flow coefficient versus percent of valve opening for a butterfly valve including the flow insert and a globe valve.

As illustrated by line 58 in FIG. 11, the flow coefficient for the butterfly valve increases rather dramatically during the initial valve opening. Thus, the butterfly valve 10 shown in FIG. 1 is ineffective at controlling the flow of fluid at low percentages of valve opening. As compared to the butterfly valve represented by line 58, a globe valve is represented by line 60 in FIG. 11. As can be clearly understood in FIG. 11, the globe valve is much more effective at controlling the flow when the valve is open less than 50%. Clearly, globe valves are more controllable at a lower percent of the valve opening. Thus, it is desirable to modify the flow characteristics of a butterfly valve such that the butterfly valve more closely approximates the flow characteristics of a globe valve, especially at lower percentage openings of the valve disc.

Figures 2, 10:
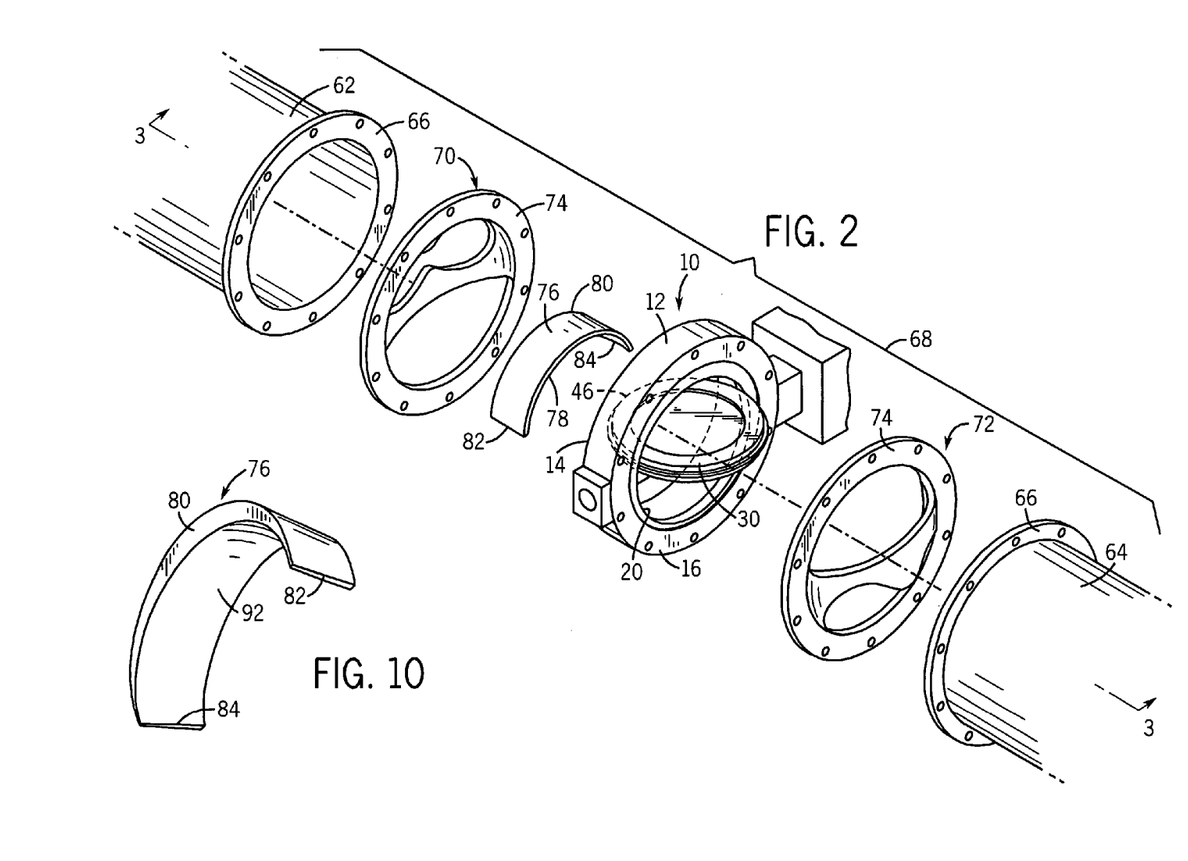
FIG. 2 is an exploded view of the triple offset butterfly valve including the flow insert and pair of butterfly cages utilized in accordance with the present invention.
FIG. 10 is a perspective view of the flow insert.

FIG. 2 illustrates a system that modifies the flow characteristics of the butterfly valve 10 such that the butterfly valve 10, with the system installed, more closely approximates the flow characteristics of a globe valve. As shown in FIG. 2, the butterfly valve 10 is positioned between an inflow pipe 62 and an outflow pipe 64, each of which includes an attachment flange 66. In the embodiment of the invention illustrated, the valve body 12 is shown mounted in a horizontal orientation such that the shaft axis extending through the valve disc 30 is horizontal.

In addition to the butterfly valve 10, the control valve assembly 68 includes a first butterfly cage 70 and a second butterfly cage 72. The first butterfly cage 70 includes an outer attachment ring 74 that allows the first butterfly cage to be mounted between the attachment flange 66 of the inflow pipe 62 and the upstream face surface 14 of the valve body 12. Likewise, the second butterfly cage 72 also includes a similar attachment ring 74 that allows the second butterfly cage 72 to be mounted between the attachment flange 66 of the outflow pipe 64 and the downstream face surface 16 of the valve body 12.

In addition to the first and second butterfly cages 70, 72, the control valve assembly 68 includes a flow insert 76. The flow insert is mounted to the outer wall 20 that defines the open passage through the valve body 12. Preferably, the flow insert 76 is mounted along the generally top half of the outer wall 20 that receives the first outer sealing edge 46 of the valve disc 30. As illustrated in FIG. 2, the flow insert has a width extending from a first edge 78 to a second edge 80. The flow insert 76 has a generally curved, arcuate shape that extends from a first end 82 to a second end 84.

Figure 3:
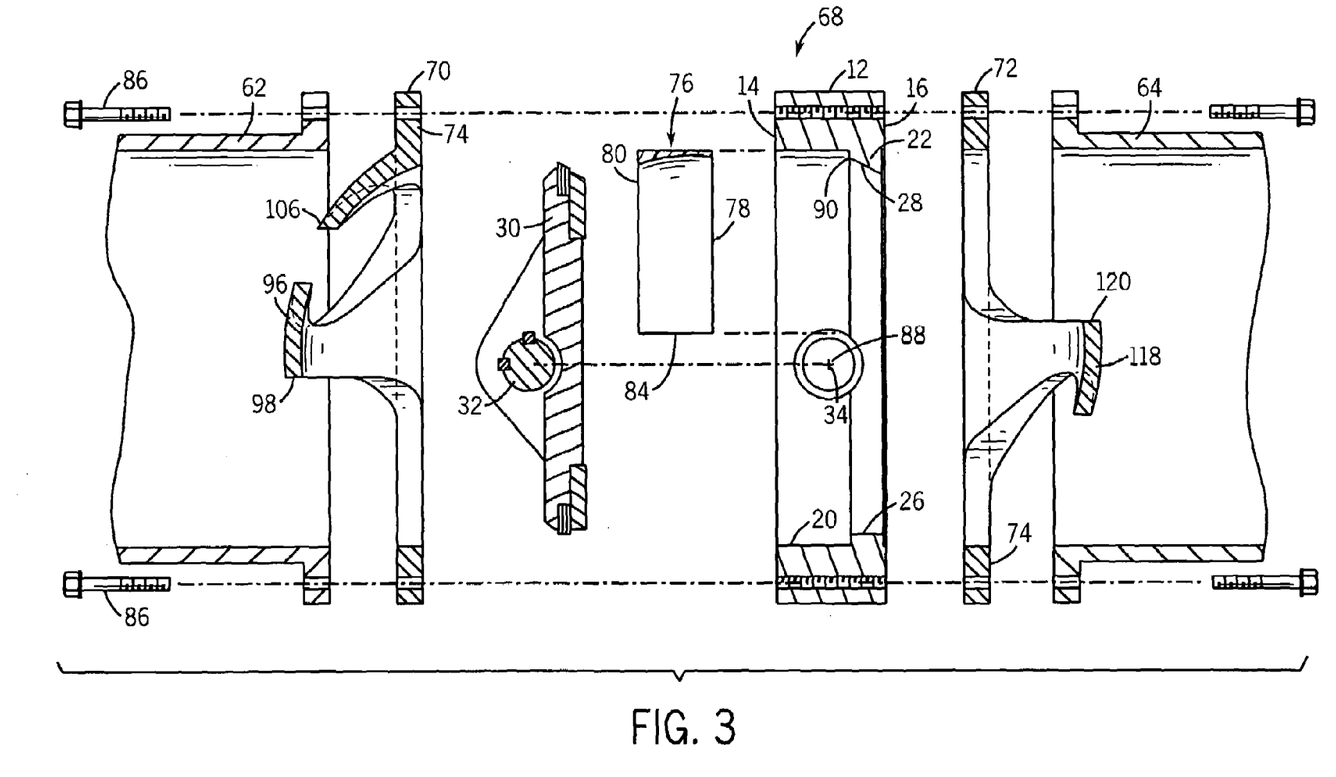
FIG. 3 is an exploded section view taken along line 3-3 of FIG. 2.

As illustrated in FIG. 3, the entire control valve assembly 68 is assembled by a series of connectors 86 that entrap the first butterfly cage 70, the valve body 12 and the second butterfly cage 72 between the inflow pipe 62 and the outflow pipe 64. The pivot shaft 32 of the valve disc 30 is received through an access hole 88 formed in the valve body 12.

As illustrated in FIG. 3, the inner edge 90 of the angled sealing surface 28 of the valve seat 22 extends above the otherwise smooth outer wall 20. As discussed previously, the angled sealing surface 28 generally extends around half of the valve body 12. In the embodiment illustrated in FIG. 3, the angled sealing surface 28 is positioned around the portion of the valve body 12 above the shaft axis 34.

Figure 4:
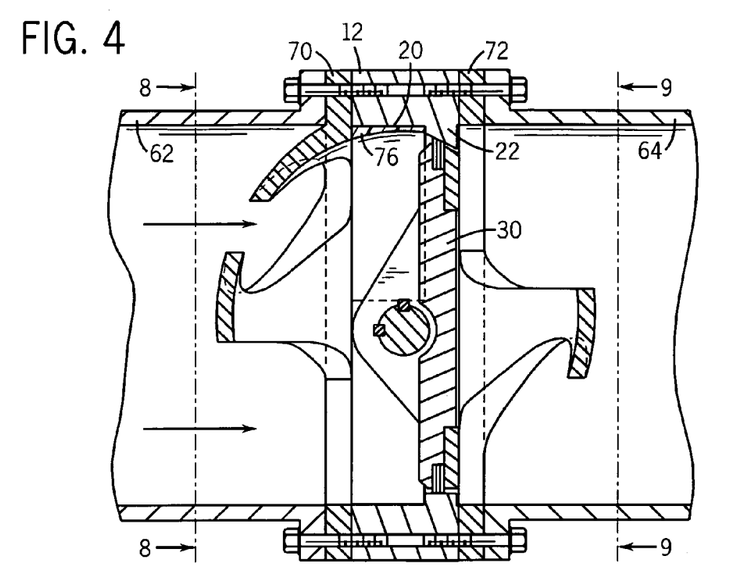
FIG. 4 is a section view of the butterfly valve including the flow insert and the pair of butterfly cages.
Figure 5:
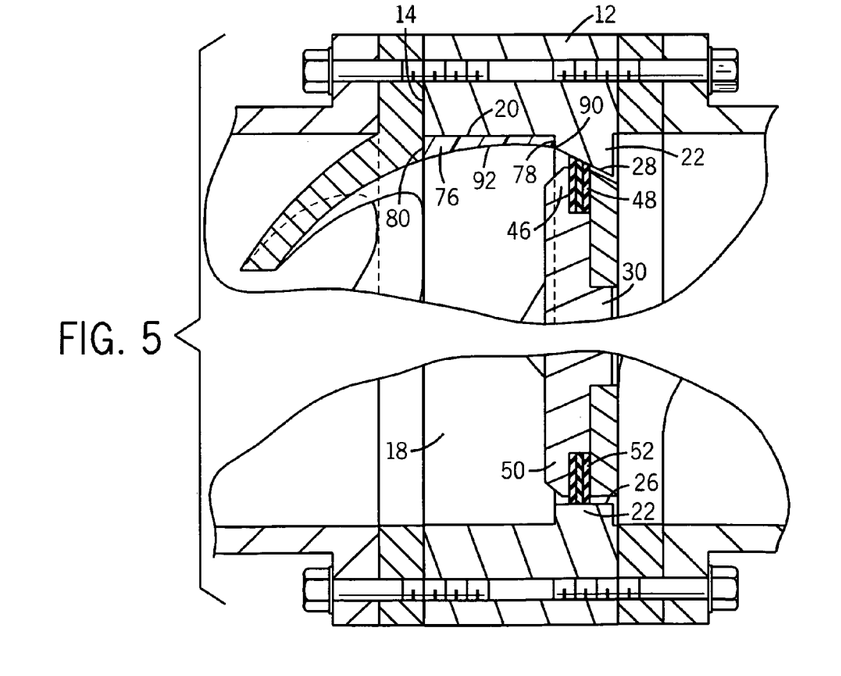
FIG. 5 is a magnified view of FIG. 4.

As illustrated in FIGS. 4 and 5, the flow insert 76 is mounted to the outer wall 20 immediately adjacent to the valve seat 22. As shown in FIG. 5, the first edge 78 of the flow insert 76 is positioned immediately adjacent to the inner edge 90 of the angled sealing surface 28. The second edge 80 of the flow insert 76 is generally aligned with the upstream face surface 14 of the valve body 12. The flow insert 76 includes a smooth contact surface 92 that extends between the first edge 78 and the second edge 80. The contact surface 92 has a curved, arcuate shape that generally corresponds to the path of movement of the seal 48 formed on the first outer sealing edge 46 of the valve disc 30. As the valve disc 30 moves from the seated position shown in FIG. 5 and begins to open, the seal 48 remains in close proximity to the contact surface 92 formed on the flow insert 76. Thus, as the valve disc 30 rotates away from the seated position, the close physical positioning between the seal 48 on the first outer sealing edge 46 and the contact surface 92 restricts the flow of fluid between the first outer sealing edge 46 and the valve seat 22.

Although the flow insert 76 shown in FIGS. 4 and 5 includes a second end 80 that it is generally aligned with the upstream face surface 14 of the valve body, is contemplated that the length of the flow insert 76 could be increased such that the second edge 80 of the flow insert would extend into the inflow pipe 62. Such an embodiment may be utilized when the first butterfly cage 70 is not installed between the inflow pipe 62 and the valve body 12. Such an embodiment will provide further enhanced flow characteristics as the valve disc 30 rotates away from the seated position to the open position.

Referring now to FIG. 10, thereshown is a perspective view of the flow insert 76. As illustrated in FIG. 10, the thickness of the flow insert 76 at the second edge 80 decreases toward both the first end 82 and the second end 84. When the flow insert 76 is installed, the first and second ends 82, 84 are positioned close to the pivot shaft 32. The decrease in thickness near the first and second ends 82, 84 allows for the free movement of the valve disc past the flow insert. Further, the contact surface 92 has a configuration that generally corresponds to the movement path of the valve disc. Thus, the configuration for the contact surface 92 will depend upon the path of movement of the valve disc and, thus, will vary for each different type of valve in which the flow insert 76 is utilized.

Although the contact surface 92 of the flow insert 76 is shown in FIG. 10 as defining a smooth surface, it is contemplated that the flow insert 76 and the contact surface 92 could be created with notches, grooves or other types of orifices as a means and method of improving the throttling near the valves closed position. The inclusion of notches, grooves and orifices as part of the flow insert 76 would be a matter of design choice depending upon the desired flow characteristics for the valve.

In the embodiment of the invention illustrated in FIGS. 4 and 5, the flow insert 46 is shown as a separate, molded component that is attached to the outer wall 20 of the valve body 12. Preferably, the insert 76 is formed a metallic material that can be adhered to the outer wall 20 through any type of conventional attachment mechanism, such as an adhesive, bolt or other type of mechanical connection such as welding. Although metal is contemplated as being the preferred material for the insert 76, the insert could also be formed from a plastic, ceramic or other type of durable material that can be attached to the outer wall 20. It is contemplated by the inventors that the flow insert 76 could also be integrally formed with the valve body 20 while operating within the scope of the invention. In such an embodiment, the flow insert 76 would be formed from the same type of material used to form the valve body 12. Although the integral formation of the flow insert 76 with the valve body 12 would function in the same manner as a separate component attached after manufacture, it is contemplated by the inventors that the creation of a separate flow insert 76 is preferred to provide the most flexible use of the butterfly valve as well as to facilitate retrofit applications.

As illustrated in FIG. 5, when the valve disc 30 rotates away from the seated position, the seal 52 formed on the second outer sealing edge 50 moves away from the flat sealing surface 26 in the downstream direction. As the seal 52 moves away from the flat sealing surface 26, fluid is allowed to flow through the gap created between the second outer sealing edge 50 and the valve seat 22. Thus, when the flow insert 76 is installed in the valve body 20, nearly all of the fluid flowing through the valve is between the second outer sealing edge 50 and the valve seat 22, thereby restricting the flow of fluid during the initial rotation of the valve disc 30.

As can be understood in the review of FIGS. 4-7, the butterfly valve controls the flow of fluid through the valve by splitting the fluid flow into two distinct areas and governing the size of the opening between the valve disc 30 and the outer wall 20. As the valve disc 30 moves from the seated position, the portion of fluid flow past the second outer sealing edge 50 is controllable while the flow of fluid past the first outer sealing edge 46 becomes uncontrollable as the first outer sealing edge 46 moves away from the angled sealing surface 28. The flow insert 76 positioned within the valve body minimizes the amount of flow past the first outer sealing edge 46 which vastly contributes to the overall improvement in controllability. At the same time, the flow insert exerts only a minimum profile when viewed from a direction parallel to the flow of fluid. Thus, the flow insert 76 causes only a minimal reduction in the maximum fully-open flow coefficient.

Referring now to FIG. 11, thereshown are the flow characteristics 94 of the butterfly valve including the flow insert, reference number 94, as compared to the butterfly valve alone 58 and a globe valve 60. As the graph illustrates, the flow coefficient for the butterfly valve with the insert 94 increases more slowly over the lower percentage valve opening as compared to the butterfly valve alone 58. The butterfly valve with the insert 94 more closely approximates the globe valve 60 and thus increases the controllability of the butterfly valve, as is desirable.

Referring back to FIG. 3, although the valve assembly 68 is shown as including both the first butterfly cage 70 and the second butterfly cage 72, it should be understood that the valve assembly 68 could be used with only the flow insert 76. In such an embodiment, the flow characteristics of the butterfly valve with the insert 76 create the flow characteristic curve 94 shown in FIG. 11. The flow characteristic curve 94 shown in FIG. 11 is an improvement over the butterfly valve alone and more closely approximates the performance characteristics of a globe valve. Although the butterfly valve can be utilized with only the flow insert 76 and without the first butterfly cage 70 and the second butterfly cage 72, the use of the first and second butterfly cage 70, 72 allows the butterfly valve to more closely approximate the flow characteristics of a globe valve, as will be discussed in greater detail below.

Figure 8:
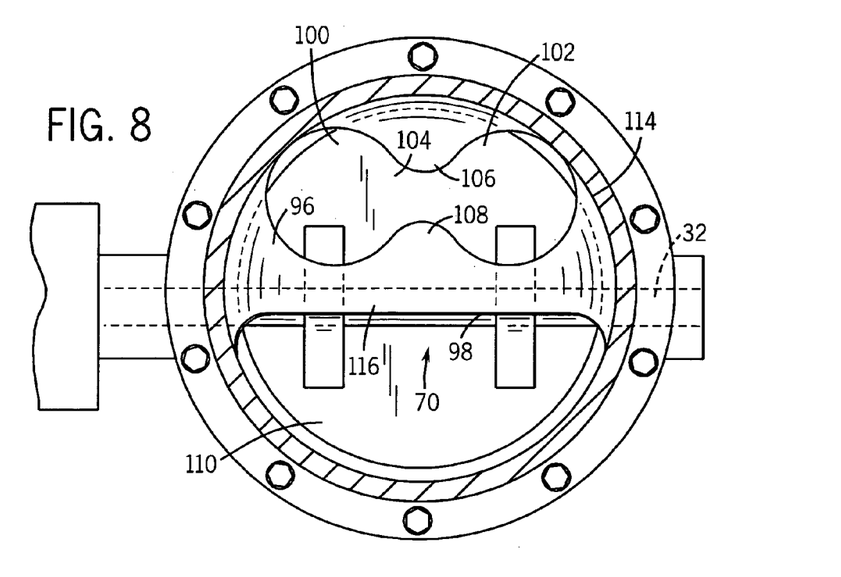
FIG. 8 is a front view of the control valve taken along line 8-8 of FIG. 4.

FIGS. 3 and 8 illustrate the configuration for the first butterfly cage 70 attached between the valve body 12 and the inflow pipe 62. The first butterfly cage 70 includes a spherical shaped outer wall 96 that extends from the attachment flange 74 to a bottom edge 98. As illustrated in FIG. 8, the bottom edge 98 is generally aligned with the center of the pivot shaft 32. As best shown in FIG. 8, the outer wall 96 includes a first flow opening 100 and a second flow opening 102 that allow fluid to flow through the outer wall 96. In the embodiment of the invention illustrated, the first flow opening 100 and the second flow opening are generally circular openings joined by a center passage 104. The center passage 104 is positioned between an upper protrusion 106 and a lower protrusion 108. The first butterfly cage 70 further defines an open lower section 110 that allows the free flow of fluid below the pivot shaft 32.

Figure 6:
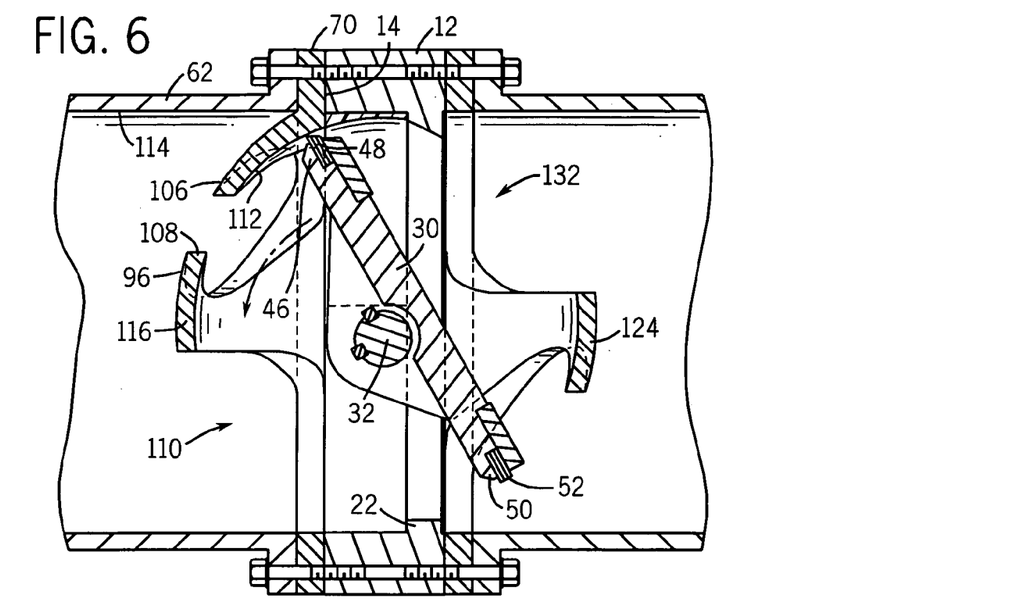
FIG. 6 is a view similar to FIG. 4 illustrating the movement of the valve disc from the seated position.

Referring now to FIG. 6, the outer wall 96 of the first butterfly cage 70 includes a smooth inner surface 112 that has a shape that generally corresponds to the path of movement of the seal 48 formed on the first outer sealing edge 46. As the valve disc 30 rotates past the upstream face surface 14 of the valve body 12, the first outer sealing edge 46 moves into close proximity to the inner surface 112. The close interaction between the first outer sealing edge 46 and the inner surface 112 further restricts the flow of fluid past the first outer sealing edge 46.

As shown in FIG. 8, each of the first and second flow openings 100, 102 extends to the inner surface 114 of the inflow pipe 62. Thus, as the first outer sealing edge 46 moves past the upstream face surface 14, a limited amount of fluid can flow past the first outer sealing edge 46 in the areas defined by the first and second flow openings 100, 102. As can be understood in FIG. 6, the open, lower section 110 of the first butterfly cage 70 allows the free flow of fluid into contact with the second outer sealing edge 50 of the valve disc 30. Thus, the first butterfly cage 70 does not have any effect on the flow of fluid below the pivot shaft 32.

As illustrated in FIG. 8, the first butterfly cage 70 includes a crossbar 116 that includes the bottom edge 98. The crossbar 116 includes the lower protrusion 108 and was found to increase the flow characteristics of the butterfly valve upon full opening of the valve disc. As illustrated in FIG. 7, when the valve disc 30 is in its fully open position, the first outer sealing edge 46 is positioned behind the crossbar 116 and thus does not affect the flow of fluid through the open passage 18.

Figure 9:
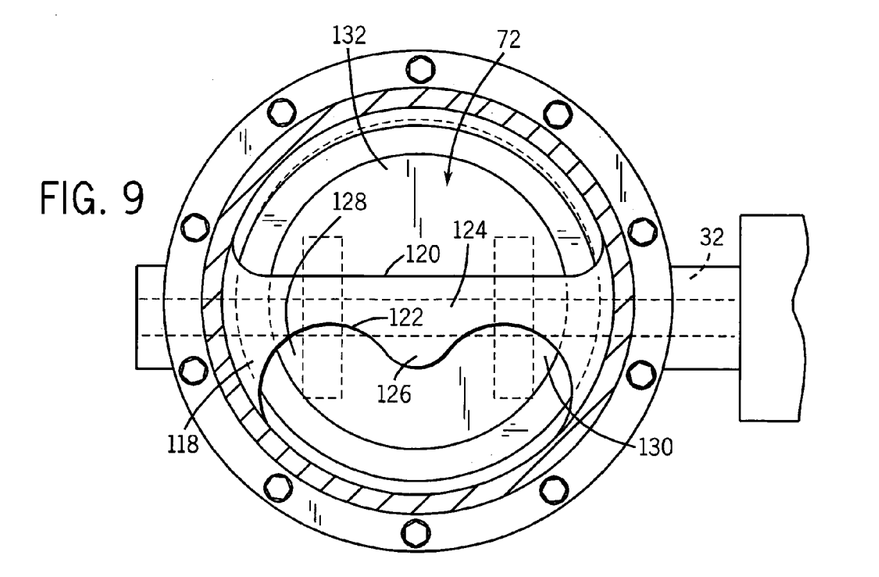
FIG. 9 is a back view of the control valve taken along line 9-9 of FIG. 4.

FIGS. 3 and 9 illustrate a preferred embodiment of the second butterfly cage 72. The second butterfly cage 72 includes a generally cylindrical outer wall 118 that extends from a top edge 120 to the attachment ring 74. As illustrated in FIG. 9, the outer wall includes a flow opening 122 that extends below a crossbar 124 that extends across the entire width of the second butterfly cage 72. The crossbar 124 is generally aligned with the pivot shaft 32. In the embodiment illustrated, the flow opening 122 includes a lower protrusion 126 that defines a first lobe 128 and a second lobe 130. The first and second lobes 128, 130 allow for the free flow of fluid once the second outer sealing edge 50 has moved away from the valve seat 22, as illustrated in FIG. 6. Referring back to FIG. 9, the second butterfly cage 72 includes an open upper section 132 that allows for the free flow of fluid once the fluid has passed the first outer sealing edge 46, as shown in FIG. 6.

Referring now to FIG. 7, when the valve disc 30 rotates to its fully open position, the second outer sealing edge 50 and the seal 52 are generally aligned with the crossbar 124, which aids in enhancing the fully open flow characteristics of the valve assembly including both the first butterfly cage 70 and the second butterfly cage 72.

Figure 12:
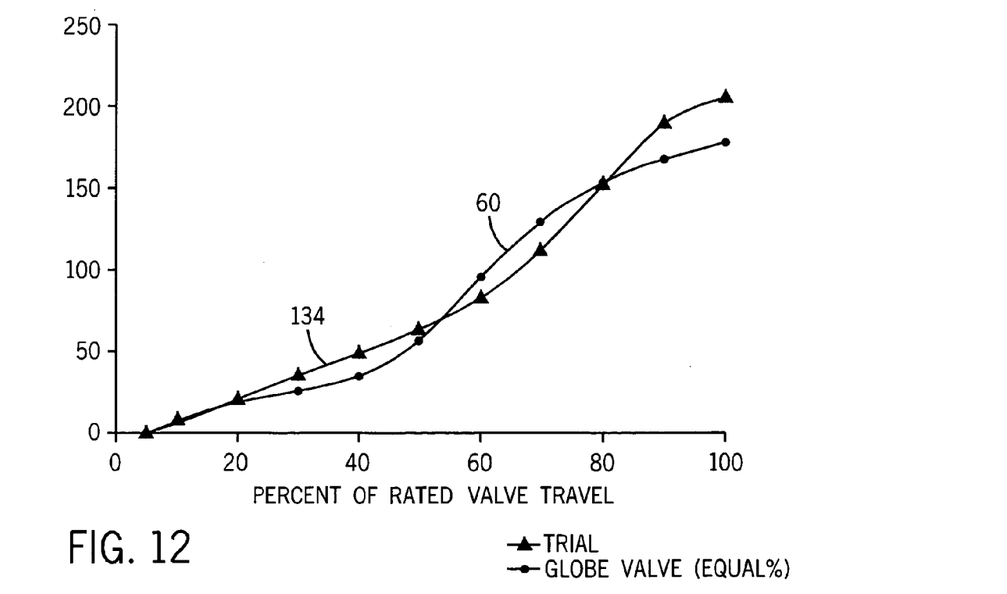
FIG. 12 is a graphic depiction of the flow coefficient versus the percent of rated valve travel by a globe valve and a butterfly valve including the pair of butterfly cages and the flow insert.

Referring now to FIG. 12, thereshown is a plot of the flow characteristics of the control valve assembly shown in FIG. 3, which includes both the first and second butterfly cage 70, 72 and the flow insert 76. As illustrated in FIG. 12, the flow characteristics for a globe valve are represented by line 60 and illustrate that during the initial 40% of valve opening, the globe valve has a very controllable increase in the flow coefficient. FIG. 12 also illustrates, by line 134, the flow characteristics for the butterfly control valve assembly of the present invention. As illustrated, during the same first 40% of rated valve traveled, the butterfly control valve 134 has very similar control effect on the flow coefficient. Likewise, as the percent of rated valve travel increases, the flow control valve of the present invention also closely approximates the characteristics of the globe valve 60. Thus, by utilizing the flow insert and the pair of upstream and downstream butterfly cages, the control valve assembly of the present invention closely corresponds to the flow characteristics of a globe valve.

Various alternatives and embodiments are contemplated as being within the scope of the following claims particularly pointing out and distinctly claiming the subject matter regarded as the invention.

What is claimed is:

1. A control valve assembly comprising:
   a valve body including an open passage extending from an upstream face surface to a downstream face surface of the valve body, the open passage defined by a generally cylindrical outer wall;
   a valve disc positioned within the open passageway and rotatable about a pivot shaft having a shaft axis, a valve disc having a first outer sealing edge and a second outer sealing edge, wherein the first and second outer sealing edges of the valve disc are on opposite sides of the shaft axis;
   a valve seat formed in the open passage, wherein the valve disc is selectively movable between a seated position in which the first and second sealing edges are in contact with the valve seat and an open position in which the first and second sealing edges are out of contact with the valve seat, wherein movement of the valve disc between the seated position and the open position varies the degree to which the valve disc blocks the flow of fluid through the open passage;
   a flow insert positioned along a portion of the generally cylindrical outer wall at a location generally aligned with the first outer sealing edge, wherein the first outer sealing edge remains in close proximity to the flow insert as the valve disc moves away from the seated position to restrict the flow of fluid past the first outer sealing edge;
   a first butterfly cage mounted to the upstream face surface of the valve body, the first butterfly cage having a flow control wall positioned on the same side of the shaft axis as the first outer sealing edge of the valve disc, the flow control wall having at least a pair of flow openings; and
   a second butterfly cage mounted to the downstream face surface of the valve body, the second butterfly cage having a second flow control wall positioned on the same side of the shaft axis as the second outer sealing edge of the valve disc, the second flow control wall having at least one flow opening.

2. The control valve assembly of claim 1 wherein the valve seat protrudes radially inward from the cylindrical outer wall of the open passage, wherein a first edge of the flow insert is positioned adjacent to the valve seat and a second edge of the flow insert is aligned with the upstream face surface of the valve body.

3. The control valve assembly of claim 2 wherein the thickness of the flow insert increases from the first edge to the second edge.

4. The control valve assembly of claim 3 wherein the flow insert is separate from the valve body and is attached thereto.

5. The control valve assembly of claim 2 wherein the first outer sealing edge moves along a first travel path having a generally arcuate shape, wherein the flow insert includes a contact surface extending between the first edge and the second edge, the contact surface generally corresponding to the first travel path.

6. The control valve assembly of claim 1 wherein the valve seat includes an angled sealing surface positioned to receive the first outer sealing edge and a flat sealing surface positioned to receive the second outer sealing edge.

7. A system for modifying the flow and control characteristics of a butterfly valve having a valve body including an open passage defined by a generally cylindrical outer wall extending from an upstream face surface to a downstream face surface and a valve disc positioned within the open passage and rotatable about a pivot shaft along a shaft axis, the valve disc having a first outer sealing edge and a second outer sealing edge on opposite sides of the shaft axis and a valve seat formed in the open passage, where the valve disc is selectively movable between a seated position in which the first and second sealing edges are in contact with a valve seat and an open position to vary the degree to which the valve disc blocks the flow of the fluid through the open passage, the system comprising:

a flow insert positionable along a portion of the generally cylindrical outer wall at a location generally aligned with the first outer sealing edge, wherein the first outer sealing edge remains in close proximity to the flow insert as the valve disc moves away from the seated position to restrict the flow of fluid past the first outer sealing edge;

a first butterfly cage mountable to the upstream face surface of the valve body, the first butterfly cage having a flow control wall positioned on the same side of the shaft axis as the first outer sealing edge of the valve disc, the flow control wall having at least a pair of flow openings; and a second butterfly cage mountable to the downstream face surface of the valve body, the second butterfly cage having a second flow control wall positioned on the same side of the shaft axis as the second outer sealing edge of the valve disc, the second control wall having a flow opening.

8. The system of claim 7 wherein the thickness of the flow insert increases from a first edge to a second edge, wherein the first edge of the flow insert is positionable adjacent to the valve seat.

9. The system of claim 8 wherein the flow insert includes a contact surface extending between the first edge and the second edge, the contact surface being configured to correspond to the travel path of the first outer sealing edge.

10. The system of claim 7 wherein the flow insert is formed separate from the valve body and is attachable thereto.

11. The control valve assembly of claim 7 wherein the valve seat protrudes radially inward from the cylindrical outer wall of the open passage, wherein a first edge of the flow insert is positioned adjacent to the valve seat and a second edge of the flow insert is aligned with an upstream face surface of the valve body.

12. The control valve assembly of claim 11 wherein the thickness of the flow insert increases from the first edge to the second edge.

13. The control valve assembly of claim 7 wherein the valve seat includes an angled sealing surface positioned to receive the first outer sealing edge and a flat sealing surface positioned to receive the second outer sealing edge.

* * * * *